US011818976B2

(12) United States Patent
Ekhe et al.

(10) Patent No.: US 11,818,976 B2
(45) Date of Patent: Nov. 21, 2023

(54) AGRICULTURAL MACHINE CONTROL BASED ON SENSED BLOCKAGE DISTANCE

(71) Applicant: Deere & Company, Moline, IL (US)

(72) Inventors: Sandeep Ekhe, Pune (IN); Mandar Mhalsakant Kale, Pune (IN); Sean A Mahrt, Le Claire, IA (US); William Douglas Graham, East Moline, IL (US); Peter R. Nedved, Coal Valley, IL (US); Grant J. Wonderlich, Milan, IL (US); Robert T. Casper, Davenport, IA (US); Omkar Joshi, Bettendorf, IA (US)

(73) Assignee: Deere & Company, Moline, IL (US)

( * ) Notice: Subject to any disclaimer, the term of this patent is extended or adjusted under 35 U.S.C. 154(b) by 583 days.

(21) Appl. No.: 17/010,324

(22) Filed: Sep. 2, 2020

(65) Prior Publication Data

US 2021/0112698 A1  Apr. 22, 2021

Related U.S. Application Data

(60) Provisional application No. 62/923,869, filed on Oct. 21, 2019.

(51) Int. Cl.
| *A01B 79/00* | (2006.01) |
| *A01B 69/04* | (2006.01) |
| *A01C 7/08* | (2006.01) |
| *A01C 14/00* | (2006.01) |
| *A01C 21/00* | (2006.01) |

(52) U.S. Cl.
CPC .......... *A01B 79/005* (2013.01); *A01B 69/008* (2013.01); *A01C 7/082* (2013.01); *A01C 14/00* (2013.01); *A01C 21/005* (2013.01)

(58) Field of Classification Search
CPC ..... A01B 69/008; A01B 79/005; A01C 7/082; A01C 14/00; A01C 21/005
See application file for complete search history.

(56) References Cited

U.S. PATENT DOCUMENTS

| 5,831,539 A | 11/1998 | Thomas et al. |
| 5,956,255 A | 9/1999 | Flamme |
| 8,078,367 B2 | 12/2011 | Sauder et al. |
| 2014/0303854 A1 | 10/2014 | Zielke |
| 2015/0105962 A1* | 4/2015 | Blackwell ............ A01B 59/002 172/1 |

(Continued)

FOREIGN PATENT DOCUMENTS

| CA | 2622428 A1 * | 3/2009 | ............ A01B 79/005 |
| WO | WO-2016182906 A1 * | 11/2016 | ......... A01B 63/1112 |

OTHER PUBLICATIONS

WO 2019084644 A1 with English Translation (Year: 2019).*

(Continued)

*Primary Examiner* — Calvin Cheung
(74) *Attorney, Agent, or Firm* — Joseph R. Kelly; Kelly, Holt & Christenson PLLC

(57) ABSTRACT

A dispensing machine dispenses a material on a field. A blockage is detected, and an initial blockage location, where the blockage started, is identified. A blockage characterization system identifies characteristics of the blockage, and a control signal generator generates control signals based upon the detected blockage, and the characteristics of the blockage.

20 Claims, 9 Drawing Sheets

(56) References Cited

U.S. PATENT DOCUMENTS

2017/0156258 A1     6/2017  Reich et al.
2018/0359906 A1*   12/2018  Foster .................. A01B 69/008
2019/0021218 A1*    1/2019  Sheppard ............. G05D 1/0088

OTHER PUBLICATIONS

Extended European Search Report and Written Opinion issued in European Patent Application No. 20200095.6, dated Mar. 10, 2021, in 10 pages.

* cited by examiner

AGRICULTURAL MACHINE CONTROL BASED ON SENSED BLOCKAGE DISTANCE

CROSS-REFERENCE TO RELATED APPLICATION

The present application is based on and claims the benefit of U.S. provisional patent application Ser. No. 62/923,869, filed Oct. 21, 2019, the content of which is hereby incorporated by reference in its entirety.

FIELD OF THE DESCRIPTION

The present description relates to agricultural machines. More specifically, the present description relates to sensing and controlling an agricultural machine based on a detected blockage.

BACKGROUND

There are a wide variety of different types of agricultural machines. Some such machines include planting machines that plant seed in a field, as well as other machines that apply material to a field. These include such things towed or self-propelled machines that apply dry products, liquids, gases, fertilizers, inoculants, micro/macro nutrients, sprays, water, pesticides, herbicides, insecticides, among other things. There may also be variations on each of these different types of machines.

For instance, there are a variety of different types of planting machines. Some include planters that have row units that open a furrow in the ground, deposit seed in the furrow, and close the furrow. The seed can be delivered under gravitational force, or by an assistive, seed delivery system.

Other types of planting machines include air seeders in which seed is delivered to a row unit, through a hose, using air flow. In such systems, the seed is pneumatically carried from a cart that holds the seed, to a row unit where it is planted. This same type of system can be used to apply fertilizer or other material. Air flow or other fluid flow can be used to deliver the other materials mentioned above as well.

In all of these types of systems, blockages can occur in which seed or other material is inhibited from moving from a container, that contains the seed or material, to its final, location in the field. There are a wide variety of different reasons why blockages can occur. For instance, many planting machines have a conduit that carries the seed to the field. The conduit has an opening at its distal end. The opening can become blocked by such things as mud, or other debris. Also, the extent of the blockage can vary. The blockage may be a complete blockage, in which no seed or material is passing through the conduit, or a partial blockage, in which the seed or material flow is reduced from a normal or expected flow. Therefore, some such systems are provided with blockage detectors. The blockage detectors generate a signal indicating whether the flow of seeds or material through the machine is undesirably impeded.

The discussion above is merely provided for general background information and is not intended to be used as an aid in determining the scope of the claimed subject matter.

SUMMARY

An agricultural machine applies material to a field. A blockage is detected, and an initial blockage location, where the blockage started, is identified. A blockage characterization system identifies characteristics of the blockage, and a control signal generator generates control signals based upon the detected blockage, and the characteristics of the blockage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, some agricultural machines have blockage detectors which generate a signal indicating that there is a blockage in a conduit that delivers seed or other material through the machine, to the field. The blockage detectors can include any of a wide variety of different types of detectors, such as infrared detectors, optical sensors, air flow sensors, mass flow sensors, among other things. Thus, an operator of an agricultural machine can be alerted to the fact that there is a blockage. However, it can be very difficult for the operator to then, operate the machine to remedy the effects of the blockage. In some examples, where the blockage has occurred for some time, the operator may wish to travel back to a location in the field where the blockage first occurred, and plant or apply material to that area of the field. In other examples, it may be a relatively limited blockage, so that the operator simply wants to clear the blockage, but does not necessarily want to return and plant the field or apply material to the field where the blockage occurred.

The present description thus proceeds with respect to a system that detects a blockage, and then identifies an initial blockage location in the field, where the blockage originated. It can analyze characteristics of the blockage to determine the extent of the blockage, how much field area is affected by the blockage, what effect the blockage may have on the ultimate yield in the field, among other things. It can then generate an action signal based upon those characteristics. For instance, it can generate an output to the operator in order to alert the operator to the blockage, to indicate the effect on estimated yield, to show an affected area, or other characteristics of the blockage, among other things. It can also illustratively either instruct the operator (e.g., plan a path) how to return to the affected area. It can also automatically steer the planting machine back to that area. Where the blockage only affected a certain number of rows, it can then selectively control the row units for those rows so that those are the only ones planting (or dispensing other material) as the vehicle travels over the affected area. In this way, other areas of the field, which were already treated, will not be treated again. The present discussion proceeds with respect to detecting a blockage in a planting machine, but it can just as easily detect a blockage in a fertilizer dispensing machine or another type of agricultural machine, such as a towed or self-propelled machine that applies dry product, liquid, gasses, fertilizers, inoculants, micro/macro nutrients, sprays, water, pesticides, herbicides, insecticides, among other material.

Figure 1:
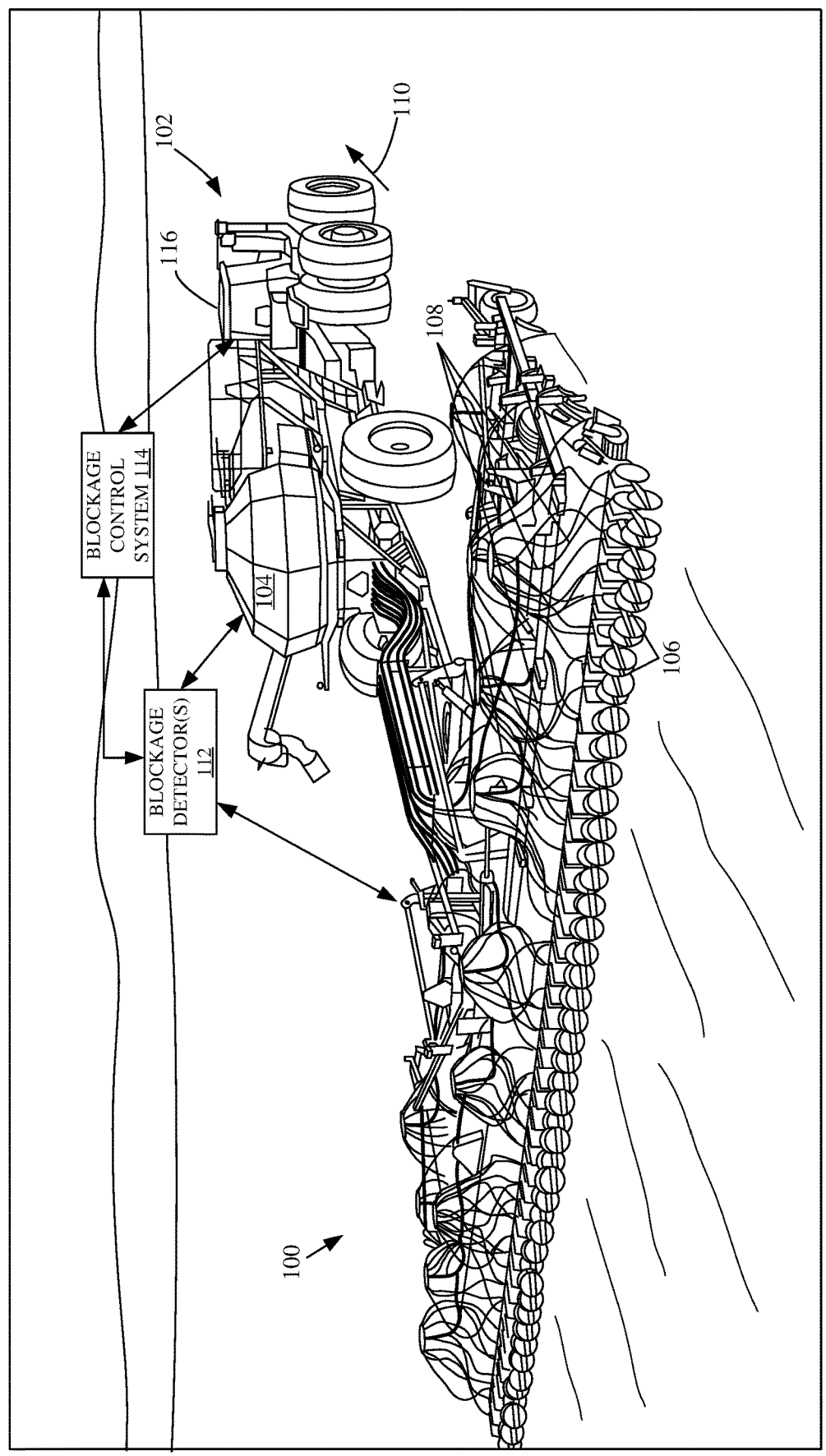
FIG. 1 is a pictorial illustration of one example of a planting machine in which a towing vehicle tows an air seeder implement.

FIG. 1 is a pictorial illustration of one example of an agricultural machine (a planting implement or planting machine) 100 that is being pulled by a towing vehicle 102 (which is illustrated as a tractor). Planting machine 100 illustratively includes an air cart 104 that carries seed. The seed is transported to a plurality of row units 106, under pneumatic pressure, by a plurality of different tubes or hoses or conduits 108. As vehicle 102 moves in the direction indicated by arrow 110, seed is transported to the row units 106 through conduits 108 where it is planted in furrows that are opened in the ground by the row units 106, and are then closed by row units 106.

It will be appreciated that blockages can occur at a variety of different places. For instance, in some systems, there is a seed metering system deployed generally at a location of an air cart 104, and beneath the air cart (or container) 104. (Seed can be metered at each row, below the seed container or in intermediate locations.) The transition from the container on air cart 104 to the seed meter can become plugged by debris or moisture that has somehow entered into container 104. Similarly, the conduits or hoses 108, themselves, can become plugged by debris, by clumped seed, etc. Also, the outlet ends, disposed at row units 106, can become blocked by mud, or other debris.

These blockages can be detected by one or more different blockage detectors 112 which generate blockage detector signals that can be provided to a blockage control system 114. Blockage control system 114 can provide control signals to an operator compartment 116, or to other control functionality in vehicle 102. It can also provide control signals back to the row units 106, to air fans that generate the air flow through conduits 108, or to other items based on the detected blockage.

Blockage control system 114 can be deployed on implement 100 or on towing vehicle 102. In another example, parts of it can be deployed in both spots (on implement 100 and towing vehicle 102) or elsewhere.

Figure 2:
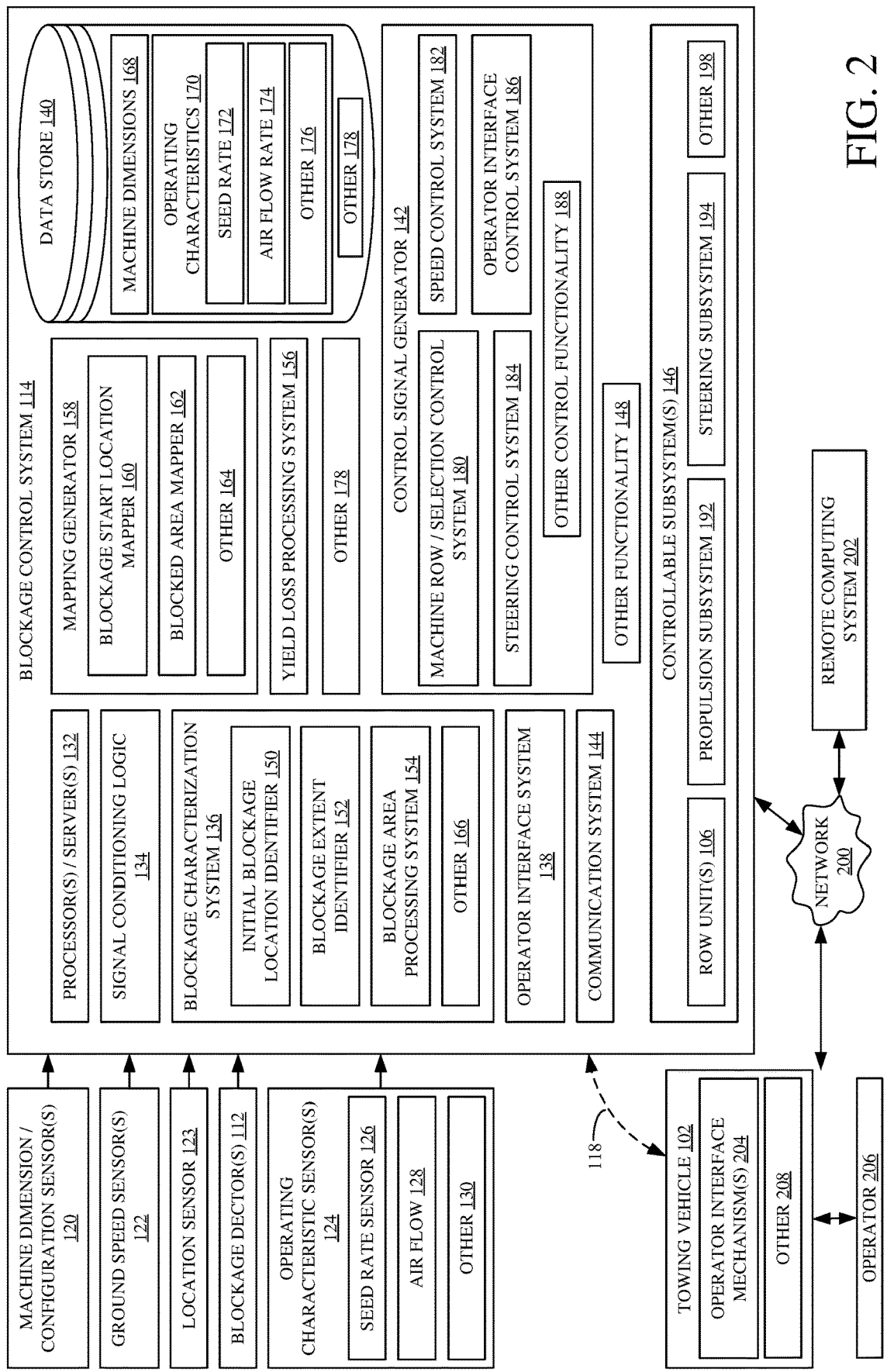
FIG. 2 is a block diagram showing one example of a blockage control system.

FIG. 2 is a block diagram showing one example of blockage control system 114 in more detail. In the example shown in FIG. 2, it will be noted that blockage control system 114 can be deployed on towing vehicle 102 or elsewhere. In addition, parts of it can be deployed on towing vehicle 102, and parts can be deployed on implement 100. The parts of system 114 can be dispersed in other ways as well. This is generally indicated by arrow 118 in the block diagram of FIG. 2.

In addition, FIG. 2 shows that blockage control system 114 can receive one or more inputs from machine dimension/configuration sensors 120 which sense the dimensions and/or configuration of implement 100. For instance, it may provide the length of the various hoses 108 that lead from container 104 to row units 106. It may provide an indication of the velocity of the air flow through hoses 108. It may provide an indication of the location of the blockage detectors on implement 100 and the dimensions of the various row units 106. It may provide an indication as to the particular configuration of implement 100 (such as whether it is mounted to the towing vehicle, whether it is a seeder with row units, whether it is an air seeder or hoe drill with an air cart, the number of row units that are provided, etc.). Sensors 120 may also provide an input indicative of the type of seed being planted, the hybrid, etc.

FIG. 2 also shows that blockage control system 114 receives an input from ground speed sensors 122, location sensor 123, and blockage detectors 112. It can receive an input from a variety of other operating characteristic sensors 124 as well. Those sensors can include such things as a seed rate sensor 126, an air flow sensor 128, and/or a wide variety of other sensors 130.

Ground speed sensor 122 can be a sensor that senses ground speed in any of a variety of different ways. It can sense the rate of rotation of an axle of implement 100 or towing vehicle 102. It can be a radar or LIDAR sensor that senses ground speed. It can be a location sensor (such as a GPS receiver, etc.) that is used to derive ground speed. Or it can be a wide variety of other ground speed sensors.

Location sensor 123 illustratively senses and provides an output indicative of a geographic location of the sensor 123. For instance, it can be a GPS receiver, a cellular triangulation sensor, a dead reckoning sensor, or any of a wide variety of other geographic location sensors. By knowing the location where location sensor 123 is mounted on implement 100 or towing vehicle 102, the particular location of the individual row units 106 can also be derived. Thus, at any point in time, once the location of sensor 123 is known, the location of the row units 106 can be derived as well. Similarly, by knowing where the blockage is detected on the implement 100 and the characteristics of the planting implement 100, a seed delivery distance/time can be determined which indicates that, when a blockage is detected by a blockage detector, that will translate to a location on the ground where the seed is missing.

As discussed above, blockage detectors 112 can be infrared or optical detectors. They can be flow rate detectors that detect the rate of flow or mass flow of seed through conduits 108 or elsewhere in the implement 100. They can be air flow sensors that sense the air flow through conduits 108 or through other portions of implement 100. They can be other types of detectors as well. Similarly, when the planting machine is a seeder, they can be optical sensors mounted to a seed tube, or to an assistive seed delivery system. They can be sensors mounted to a seed meter or mounted to other portions of the planter.

Operating characteristic sensors 124 illustratively sense other operating characteristics that may be used by blockage control system 114. For instance, it can be a seed rate sensor 126 that senses the rate at which seeds are flowing through implement 100, or the rate at which seeds are supposed to be planted according to a prescribed seed rate level. They can include air flow sensor 128 or other sensors 130.

In the example shown in FIG. 2, blockage control system 114 illustratively includes one or more processors or servers 132, signal conditioning logic 134, blockage characterization system 136, operator interface system 138, data store 140, control signal generator 142, communication system 144, controllable subsystems 146, and it can include a wide variety of other functionality 148. Blockage characterization system 136 illustratively includes initial blockage location identifier 150, blockage extent identifier 152, blockage area processing system 154, yield loss processing system 156, mapping generator 158 (which can include blockage start location mapper 160, blockage area mapper 162 and other items 164) and other items 166. Data store 140 can include machine dimensions 168, operating characteristics 170 (which can include a prescribed seed rate 172, an air flow rate 174, or other items 176) and it can include a wide variety of other data items 178. Control signal generator 142 illustratively includes machine row/section control system 180, speed control system 182, steering control system 184, operator interface control system 186, and it can include other functionality 188. Controllable subsystems 146 can include row units 190, propulsion system 192, steering system 194, operator interface subsystem 196, and it can include other subsystems 198.

Blockage control system 114 is also shown, in FIG. 2, communicating with towing vehicle 102 over network 200. It can also communicate with other remote computing systems 202. Thus, remote computing systems 202 can be farm manager computing systems, vendor computing systems, manufacturer computing systems, maintenance personnel computing systems, among others. Towing vehicle 102 is shown with an operator interface mechanism 204 that can be actuated by operator 206 in order to control and manipulate towing vehicle 102 and some portions of blockage control system 114. Towing vehicle 102 can include other items 208 as well.

The operator interface mechanisms 204 can include a steering wheel, levers, pedals, linkages, joysticks, a touch screen mechanism, a microphone (where speech recognition is provided), among other things. The user interface mechanisms can receive inputs from an operator and generate outputs to the operator. Therefore, the operator interface mechanisms can include a wide variety of different types of visual, audio or haptic mechanisms, or other mechanisms.

Before describing the overall operation of blockage control system 114, a brief description of some of the items in blockage control system 114, and their operation, will first be provided. It is first worth noting that communication system 144 can be configured to facilitate communication among items in system 114. It can also illustratively facilitate communication with the operator interface mechanisms 204 in towing vehicle 102, over network 200, and with remote computing system 202. Therefore, depending on the type of network 200, communication system 144 may vary accordingly.

Network 200 can include a controller area network, a local area network, a wide area network, a near field communication network, a cellular communication network, or any other of a wide variety of different types of wired or wireless networks, or combinations of networks.

Signal conditioning logic 134 receives inputs from the various sensors and other input mechanisms and can perform signal conditioning. For instance, the signal conditioning can include amplification, normalization, linearization, filtering, and any of a wide variety of other signal conditioning. Similarly, where values are to be obtained by combining sensor signals or other inputs in different ways, signal conditioning logic 134 can perform some or all of that combination or aggregation. Blockage characterization system 136 illustratively detects various characteristics of a presence of the blockage. The detected blockage can be indicated by blockage detector 112. Initial blockage location identifier 150 illustratively identifies the initial geographic location where the blockage started (e.g., the location on the ground that is missing seed due to the detected blockage).

Initial blockage location identifier 150 thus detects where the blockage has occurred (such as which row unit 106, which hose 108, etc.). Initial blockage identifier 150 accesses machine dimensions 168 to determine a geographic location of the row unit(s) 106 affected by the blockage. It can identify this location by determining an offset between the location sensor 123 and the affected row units 106 and by detecting the ground speed of machine 102, the length of time since the blockage was detected, the speed at which seed moves from the detector to the ground, and in other ways. For instance, assume that blockage detector 112 detects a blockage on one of the extremely outlying row units 106 on implement 100. Initial blockage location identifier 150 accesses the machine dimensions 168 to identify the spatial offset between that row unit 106 and location sensor 123. It also receives the ground speed indicated by ground speed sensor 122 and the time that has passed since the blockage was detected. It calculates the seed transit time form the blockage detector to the ground. Initial blockage location identifier 150 can thus calculate the geographic location of the particular row unit 106 that was blocked, when the blockage was first sensed, and thus the geographic location on the ground that is missing seed due to the detected blockage (e.g., the blockage start location).

Blockage extent identifier 152 can identify the extent of the blockage. For instance, it may determine how many row units are blocked. It may also determine (whether a row unit has a complete blockage, or a partial blockage). By way of example, it may access the expected seed rate value 172 indicating an expected seed rate at a particular row unit. The blockage detector 112 may indicate that the seed rate is only half of the expected seed rate. In that case, blockage extent identifier 152 can determine that the blockage is only a partial blockage, and provide an output indicating that. Blockage extent identifier 152 and/or blockage area processing system 154 can also be operator configurable or otherwise configurable to define characteristics of a blockage. For example, it can be configured so that the operator will only be shown blockage of a certain size (e.g., length in the field with no seed, area in the field with no seed, etc.). When that occurs, then the entire area affected by the blockage can be shown on the map that is displayed. Similarly, a blockage can be defined as occurring when the actual seed rate falls a threshold amount below an expected seed rate. In such an example, the detected blockage will result in a location on the ground having fewer seeds than expected. These are examples of how a blockage can be defined and other ways are contemplated herein as well.

Blockage area processing system 154 illustratively determines an area in the field that is affected by the blockage. For instance, if a number of individual row units are blocked, or a plurality of adjacent row units are blocked, then based on the distance that machine 100 has traveled since the blockage occurred, the area that is affected by the blockage can be determined. Similarly, the location of the affected area, in the field, can also be identified.

Yield loss processing system 156 illustratively determines, based upon the extent of the blockage, and the affected area, how the overall yield of the field is likely to be affected because of this particular blockage. This can be done by accessing historic yield values for the field, a predicted yield, or in other ways.

Map generator 158 can then generate a map that can be displayed to the operator, sent to a remote computing system 202, or stored for later analysis. Blockage start location mapper 160 illustratively identifies, on a map, the location in the field where the blockage started. Blocked area mapper 162 illustratively identifies, on a map, the geographic location of the area in the field affected by the blockage.

Operator interface system 138 can generate an output that can be used to generate an operator interface on one or more of the operator interface mechanisms 204. System 138 can also detect user interaction with that interface, where it is presented in an interactive form.

Control signal generator 142 illustratively generates control signals that are used to control controllable subsystems 146, based on the detected blockage. Machine row/section control system 180 can generate control signals that are used to control different sections or row units 106 on implement 100. For instance, where towing vehicle 102 returns to a site where a blockage existed, then machine row/section control system 180 can control the individual row units so that only the row units traveling over the affected area where blockages have occurred are turned on. Speed control system 182 can generate speed control signals to control propulsion subsystem 192 and thus to control the speed of towing vehicle 102. For instance, where a relatively severe blockage has been detected, speed control system 182 can control towing vehicle 102 to stop until the blockage is rectified by the operator. Steering control system 184 can control the steering subsystem 194 of vehicle 102 as well. For instance, it may be that the operator provides an input indicating that he or she wishes to return to an affected area to reseed it. In that case, it may be that the operator simply provides an input through one of operator interface mechanisms 204, and speed control system 182 and steering control system 184 automatically control towing vehicle 102 to return to the area affected by the blockage. When it returns to that area, then machine row/section control system 180 can automatically activate the particular row units 106 that need to be activated, in order to reseed in areas that were previously blocked. By automatically, it is meant, in one example, that the operation is performed without further operator involvement, except perhaps to initiate or authorize the operation.

Operator interface control system 186 generates control signals that can be used to control the operator interface system 138.

Figure 3:
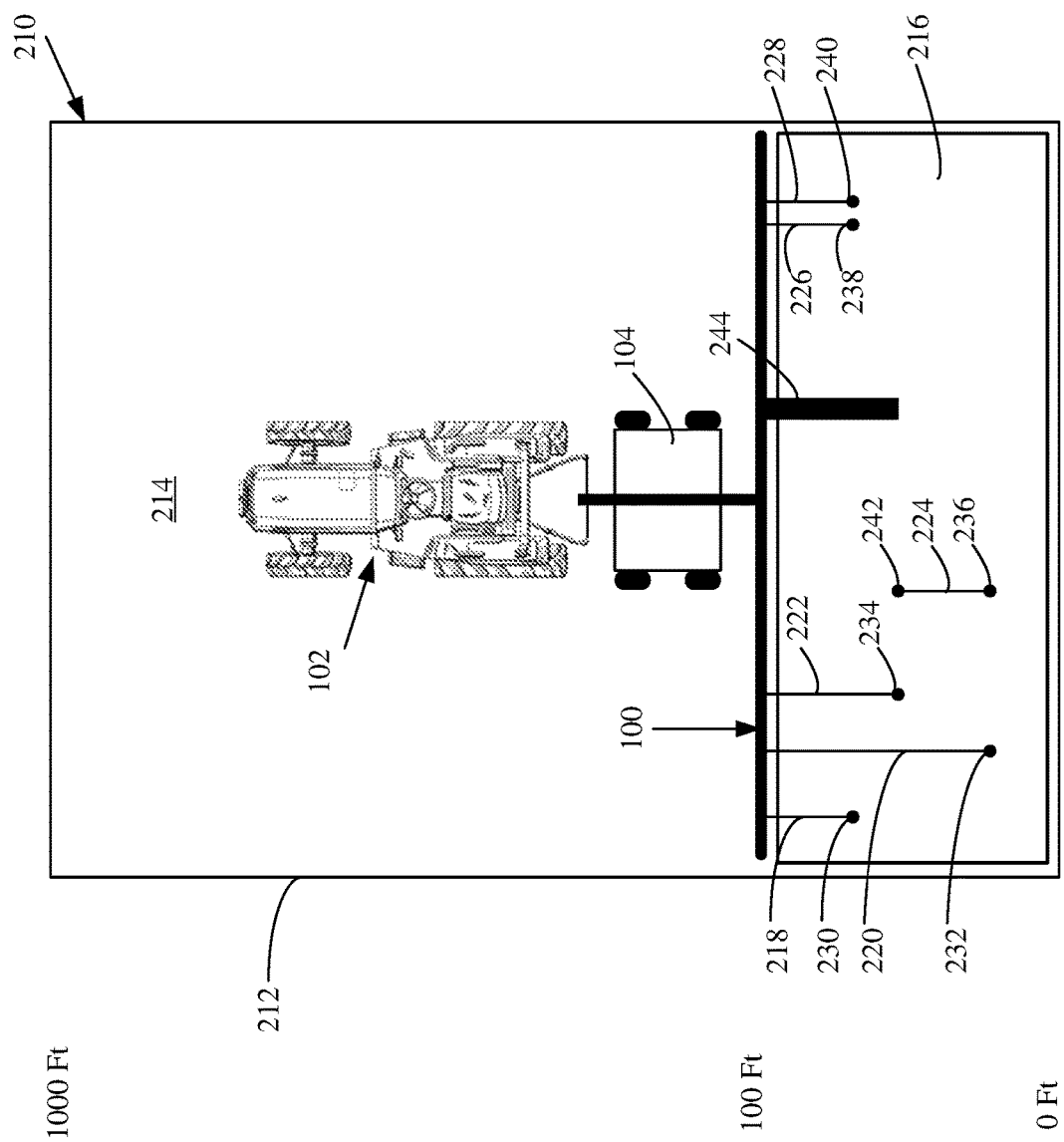
FIG. 3 is a pictorial illustration of one example of a user interface display that can be generated and displayed to an operator.

FIG. 3 is a pictorial illustration showing one example of a user interface display that can be generated on an operator interface mechanism 204 for operator 206. The user interface display is illustrated by numeral 210 in FIG. 3. Display 210 shows a bounded area 212 that depicts a field being seeded. The unshaded area 214 is an unseeded area while the shaded area 216 represents the area that has already been seeded. It can be seen that towing vehicle 102 and seeding implement 100 are also depicted on display 210. Display 210 also graphically illustrates a number of different blockages that have been detected, and the display elements used to show them may vary based upon the characteristics of those blockages. For instance, graphical elements 218, 220, 222, 224, 226 and 228 identify blockages that each occurred in a single row on implement 100. Each of the blockages has a dot that represents the geographic location in field 212, where the blockage started. For instance, graphical element 218 has a display element (or blockage start indicator) 230 that indicates where the blockage started for that particular row. Graphical element 220 has a blockage start indicator 232. Graphical element 222 has a blockage start indicator 234. The other graphical elements have blockage start indicators 236, 238, and 240. Similarly, where a blockage occurred, but has been cleared, the graphical element for that blockage also has a blockage end indicator. For instance, it can be seen that graphical element 224 has a blockage start indicator 236, and also a blockage end indicator 242. End indicator 242 identifies the geographic location in field 214 where the blockage in that row ended. The remaining graphical elements are generated for blockages that continue. Therefore, they do not yet have a blockage end indicator.

FIG. 3 also shows a graphical element 244. Graphical element 244 is an area that corresponds to a blockage that has simultaneously occurred in multiple adjacent rows. For instance, it may be that a plurality of adjacent row units 106 are all blocked. FIG. 3 shows that this has been detected, and is indicated by graphical element 244.

A number of other things can also be represented on display 210. For instance, it may be that some of the detected blockages are only partial blockages. This may be indicated by the shading level of the graphical elements representing the detected blockages, by the color of those graphical elements, or by some other visual indicia. For instance, it may be that total blockages are depicted in red or are represented by flashing display elements. Partial blockages may be depicted in green, or represented by solid, light grey graphical elements. These are examples only.

The same can be done for blockages based on the effect they may have on the estimated yield for field 214. For instance, if yield loss processing system 156 generates an output indicating that a particular blockage will have a relatively significant effect on the estimated yield for the field, then that graphical display element, corresponding to the detected blockage, may be displayed using one type of visual indicia. However, if yield loss processing system 156 determines that the yield loss will not have a great effect, then the corresponding graphical display element may be generated using a different type of visual indicia.

Also, the display may show information that allows the operator to simply reverse the machine to a position when the blockage started. The display can show the total distance to travel, that the vehicle must travel, in reverse to reach the start of the untreated area. The distance display can be decremented as the machine moves toward the desired location. When the distance display reaches zero, then the machine is in the proper location to re-seed.

Figure 4:
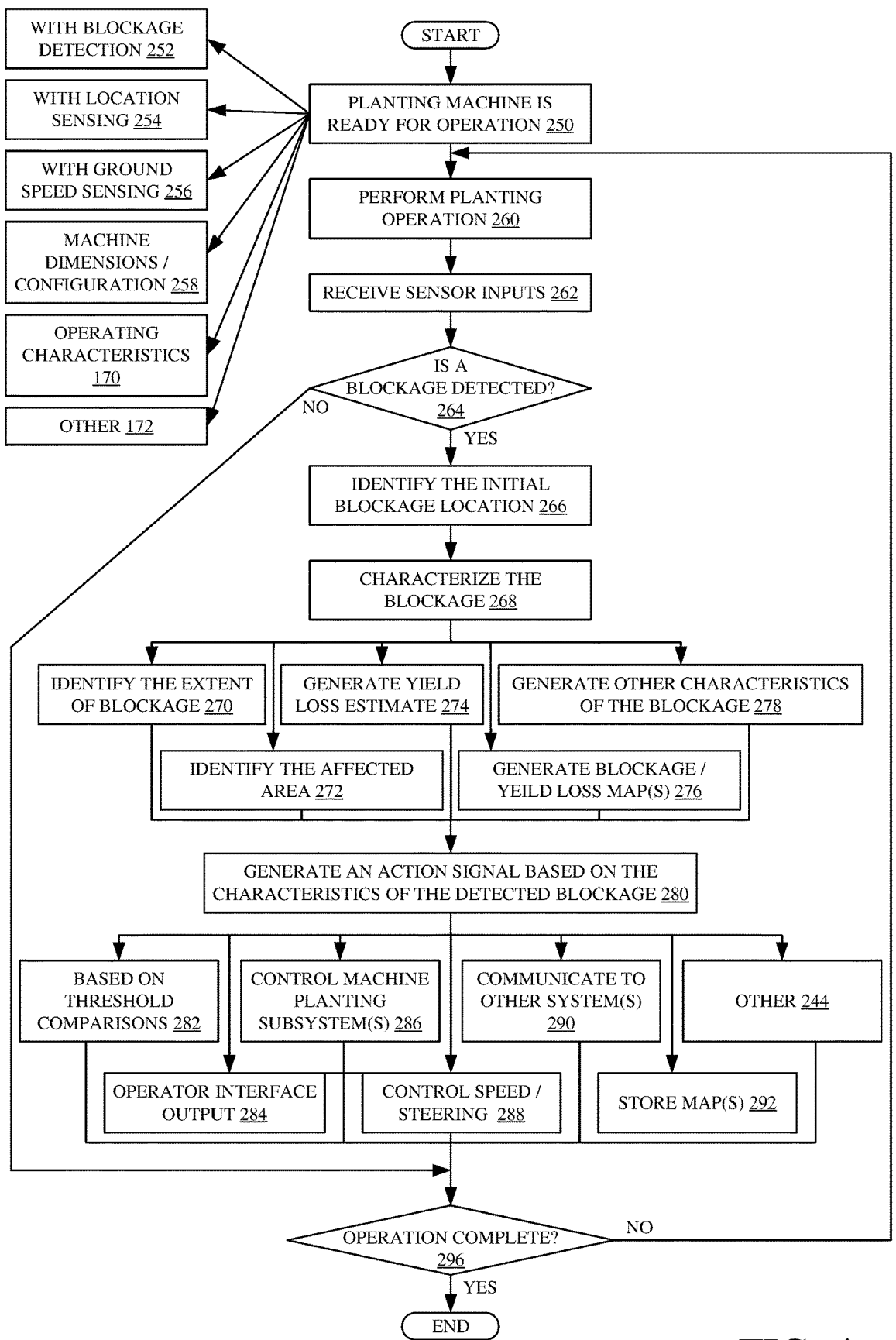
FIG. 4 is a flow diagram illustrating one example of the operation of the blockage control system shown in FIG. 2.

FIG. 4 is a flow diagram illustrating one example of the operation of blockage control system 114 in detecting blockages, characterizing those blockages, and generating control signals. It is first assumed that a planting machine (such as machine 100) is ready for operation. This is indicated by block 250 in the flow diagram of FIG. 4. In one example, the machine has blockage detection (such as blockage detectors 112). This is indicated by block 252. It also illustratively has location sensing (such as location sensor 123). This is indicated by block 254. It can include a ground speed sensor 122 for ground speed sensing, as indicated by block 256. It can have sensors that sense machine configuration and/or dimensions, or the machine dimensions and/or configuration can be pre-stored in data store 140. This is indicated by block 258. It can store a variety of different operating characteristics 170 (such as a prescribed seed rate, a prescribed air flow level if an air seeder is being used, a flow rate indicating a desired seed flow rate through conduits 108, or other operating characteristics). The planting machine can be ready for operation in a wide variety of other ways as well, and this is indicated by block 172.

The planting machine then begins to perform a planting operation. This is indicated by block 260 in the flow diagram of FIG. 4. Blockage control system 114 receives the various sensor inputs, as indicated by block 262. It may be that the sensor inputs are buffered or are not processed until the blockage detector 112 indicates a detected blockage. In another example, the sensor signals can be intermittently processed or continuously processed.

At some point, blockage detectors 112 provide a blockage signal to system 114 indicating that a blockage is detected. The signal can be conditioned by signal conditioning logic 134 or processed in other ways. Detecting a blockage is indicated by block 264 in the flow diagram of FIG. 4.

Blockage characterization system 136 then begins identifying the different characteristics of the blockage. Initial blockage location identifier 150 identifies the geographic location in the field being planted where the blockage started. This is indicated by block 266. Blockage characterization system 136 then begins detecting and generating additional characteristics that characterize the detected blockage. This is indicated by block 268. It will also be noted that multiple blockages may be simultaneously detected. In that case, there may be multiple instances of blockage characterization system 136, or blockage control system 114, processing the multiple blockages, or a single instance can process the multiple blockages at the same time. For instance, it can identify the blockage start locations of multiple different blockages that are simultaneously (or nearly simultaneously), detected. It can concurrently characterize those blockages as well.

In one example, blockage extent identifier 152 can identify the extent of the blockage. This is indicated by block 270. As discussed above, it can determine whether multiple rows are blocked, whether a single row is blocked, whether the blockage is a complete or partial blockage, etc.

Blockage area processing system 154 can identify the area in the field being planted that is affected by the blockage. This is indicated by block 272. It can use machine dimensions and other information to identify, the number of rows that are blocked, the location where the blockage started, the speed of the towing vehicle 102, and other items that are needed to identify the affected area.

Based on the area that is affected by the blockage, yield loss processing system 156 illustratively generates a yield loss estimate corresponding to the blockage. This is indicated by block 274. It will be noted that yield loss processing system 156 can also generate an aggregate yield loss metric, indicative of an aggregate estimated yield loss that is aggregated based upon all of the detected blockages that have been detected in the field being planted. It can aggregate the yield loss estimates in other ways as well.

Mapping generator 158 can map the various values or characteristics that have already been determined to different geographic locations in the field being planted. For instance, it can map the blockage start location using mapper 160. It can map the blocked area (or area affected by each blockage) using mapper 162. It can generate outputs indicative of estimated yield loss corresponding to each detected blockage. It can generate outputs indicative of the extent of the blockage, and it can generate a wide variety of other blockage/yield loss maps as well. This is indicated by block 276.

Blockage characterization system 136 can characterize the detected blockages by generating or sensing other characteristics of the blockage as well. This is indicated by block 278.

Control signal generator 142 then generates an action signal, or control signal, based upon the characteristics of the detected blockage. This is indicated by block 280 in the flow diagram of FIG. 4. The action or control signal can be generated in a wide variety of different ways, and it can take a number of different forms.

For instance, the action signal or control signal can be generated based on threshold comparisons as indicated by block 282. By way of example, if the blockage is affecting the yield by less than 10%, then the control signal may take one form. If it is affecting the yield by more than 10%, but less than 20%, it may take another form. The control signals or action signals can be generated based on ranges or thresholds in other ways. For instance, if the blockage is detected on more than a threshold number of rows, and/or if the blockage is a complete blockage, this may result in one set of action signals or control signals. However, if the blockage is detected on a different number of rows and/or the extent of the blockage is different, this may result in a different set of action signals or control signals.

By way of example, if the blockage is relatively minor, then an operator interface display may be generated indicating that some blockages have been detected but that the effect is relatively minor. As the effect of the blockage grows, based upon the detected characteristics of the blockage, then the display item may be updated to a more urgent display item, or it may be accompanied by an audible alert, or it may change in other ways. Generating an operator interface output using the action signal or control signal is indicated by block 284.

In another example, control signal generator 142 can generate control signals to automatically control certain subsystems of the machine based upon the detected blockage. For instance, it may control the row units 106 or it may control sections of a planting machine 100, automatically, to actuate them when the machine is repositioned to replant the area that was previously blocked. Controlling the machine planting subsystems 146 is indicated by block 286 in the flow diagram of FIG. 4.

Speed control system 182 and steering control system 184 may control the speed and steering of the planting machine, automatically, or based on operator inputs. It can automatically control steering of the machine to return to unplanted areas (that were not planted due to a blockage) so that they can be planted. Automatically controlling the speed and steering of the machine is indicated by block 288 in the flow diagram of FIG. 4.

Control signal generator 142 can automatically control the communication system 144 to communicate the characteristics of the detected blockage to remote computing systems 202. This is indicated by block 290 in the flow diagram of FIG. 4. A remote user can then analyze the blockages, determine what (if any) actions need to be taken, and take those actions (e.g., communicate them to an operator 206).

The control signal generator 142 can generate control signals to control map generator 158 to store the maps that have been generated in data store 140, or to send them to remote computing systems 202, or elsewhere, for storage. Storing the maps is indicated by block 292.

Control signal generator 142 can generate a wide variety of other control signals as well. They can control different aspects of the planting machine, of remote systems, etc. This is indicated by block 294.

If the operation is not yet complete, as indicated by block 296, then operation reverts to block 260 where the machine continues to perform the planting operation and receive the sensor inputs. Once the planting operation is complete, then the characteristics of the different blockages can be saved, transmitted to remote systems, or processed in other ways.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 5:
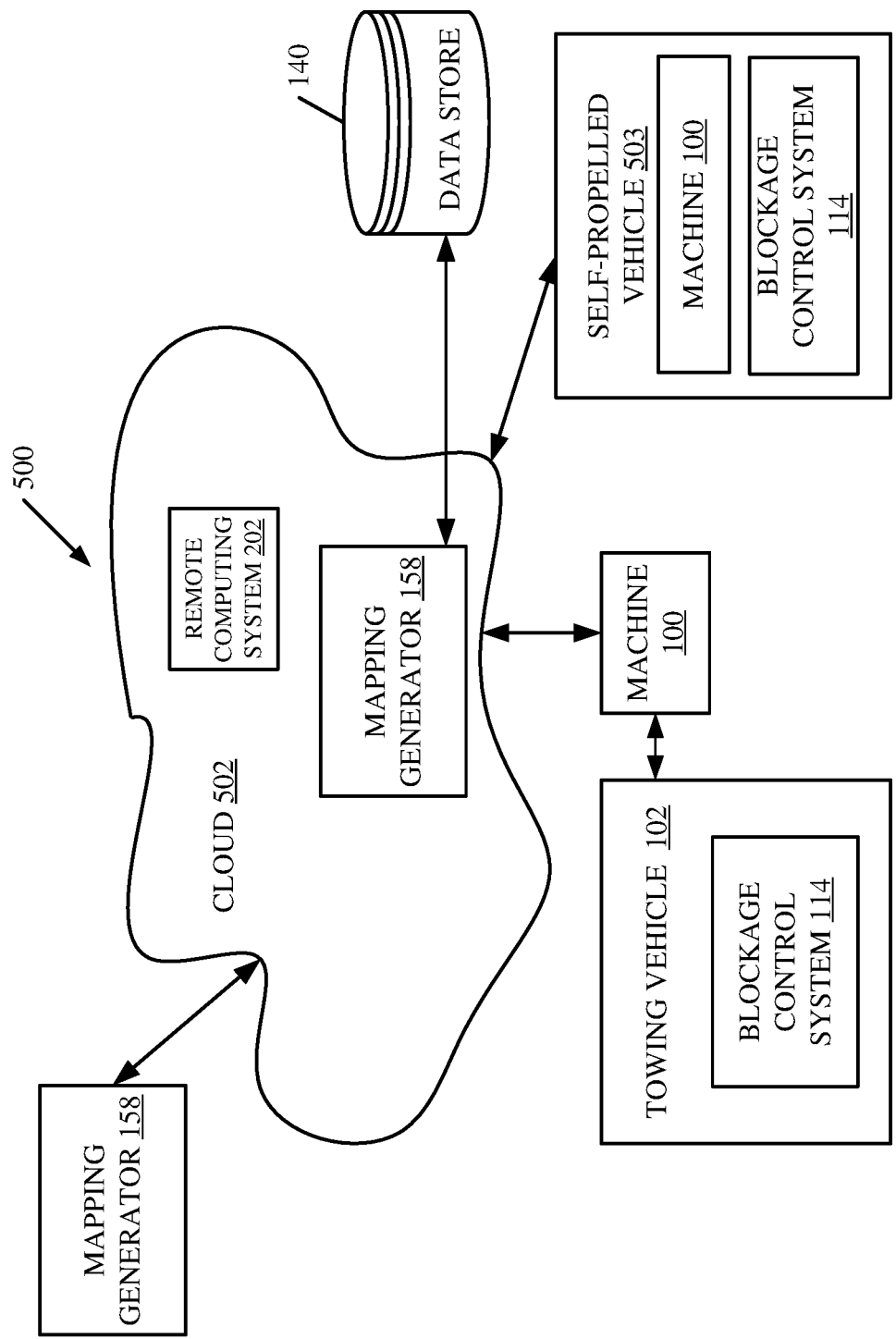
FIG. 5 is a block diagram showing one example of the architecture shown in FIG. 2, deployed in a remote server environment.

FIG. 5 is a block diagram of machine 100, shown in FIG. 1, and blockage control system 114, shown in FIG. 2, except that they interact with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIG. 1 and they are similarly numbered. FIG. 5 specifically shows that remote computing system 202, mapping generator 158, and data store 140 can be located at a remote server location 502. Therefore, machine 100 accesses those systems through remote server location 502.

FIG. 5 shows that blockage control system 114 can also be used on a self-propelled vehicle 503 that uses machine 100 to apply a material.

FIG. 5 also depicts another example of a remote server architecture. FIG. 5 shows that it is also contemplated that some elements of FIG. 2 are disposed at remote server location 502 while others are not. By way of example, data store 140 or mapping generator 158 can be disposed at a location separate from location 502, and accessed through the remote server at location 502. Regardless of where they are located, they can be accessed directly by machine 100 (or vehicles 102, 503), through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine comes close to the fuel truck for fueling, the system automatically collects the information from the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine until the machine enters a covered location. The machine, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
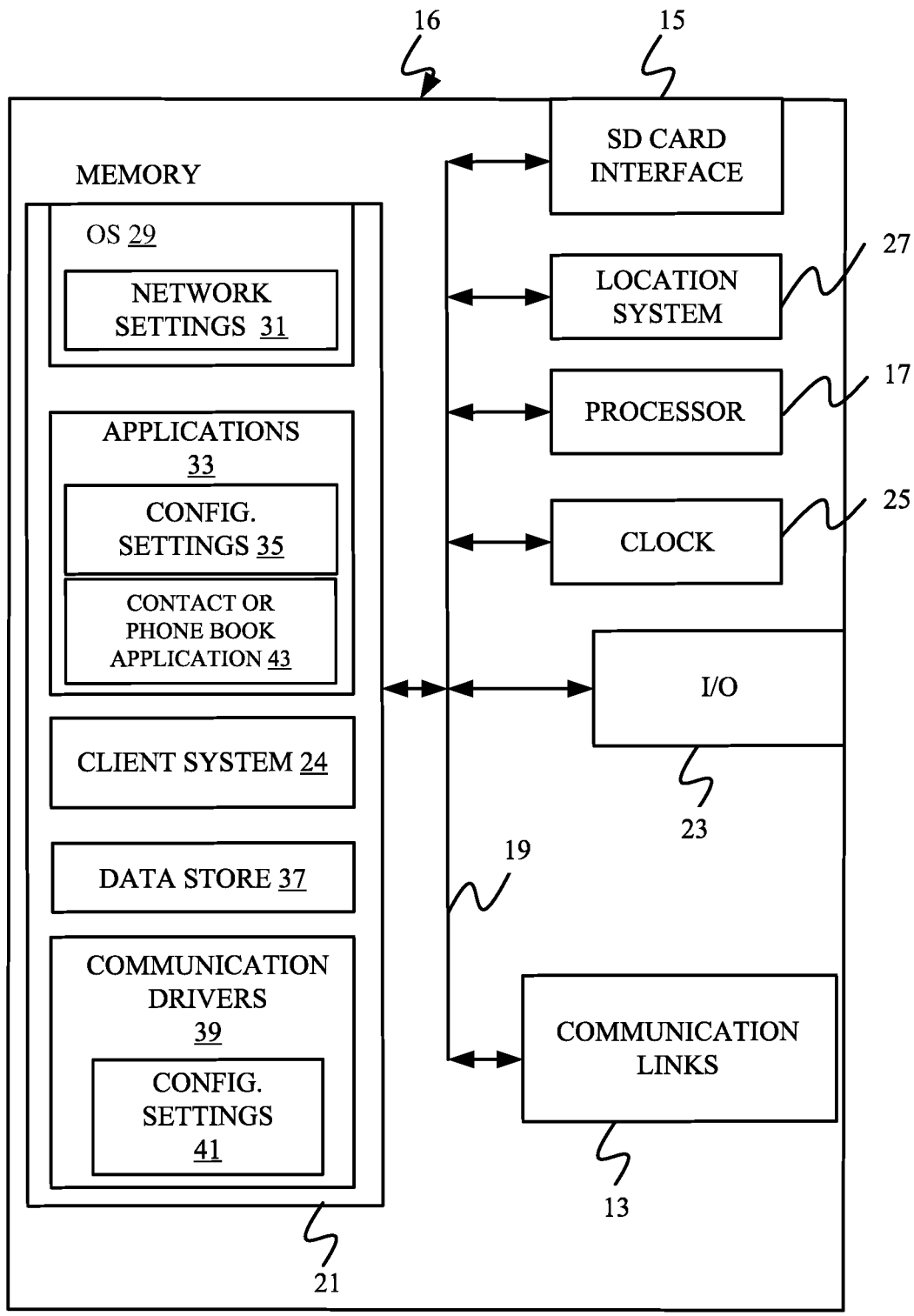
FIGS. 6-8 show examples of mobile devices that can be used in the architectures illustrated in the previous figures.
Figure 7:
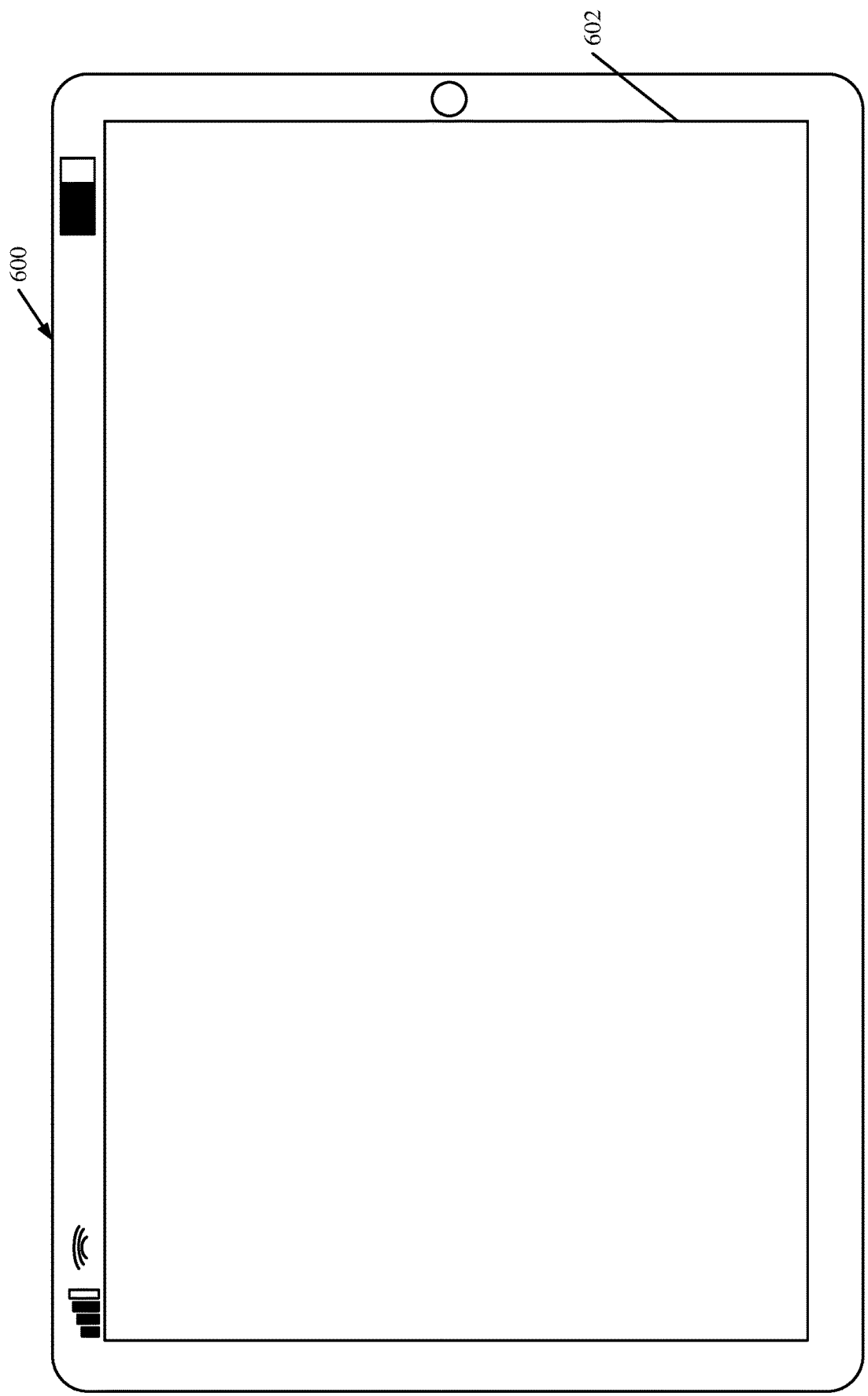
Figure 8:
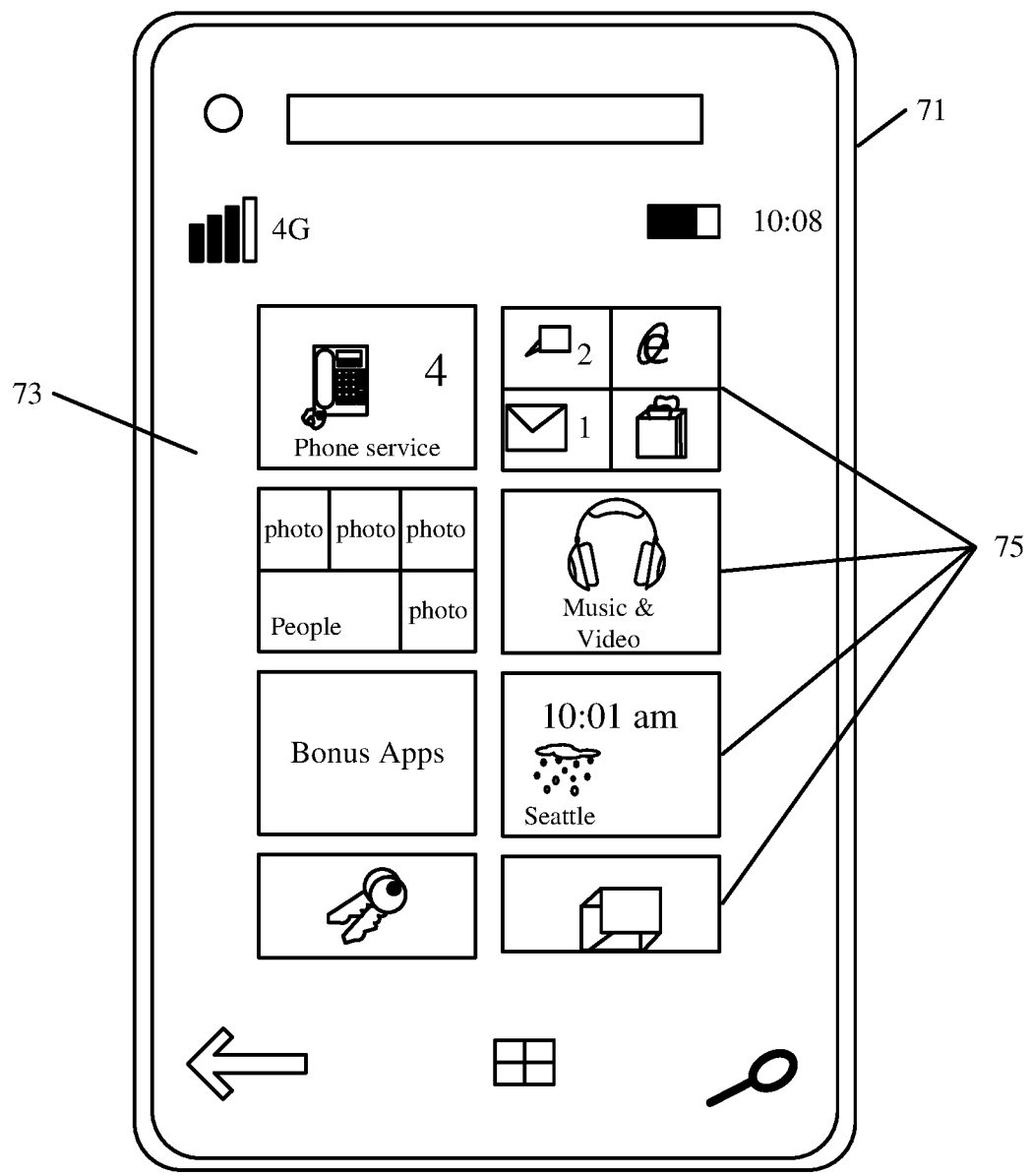

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of towing vehicle 102 for use in generating, processing, or displaying the blockage data. FIGS. 7-8 are examples of handheld or mobile devices.

FIG. 6 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning.

Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors/servers from FIG. 2) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
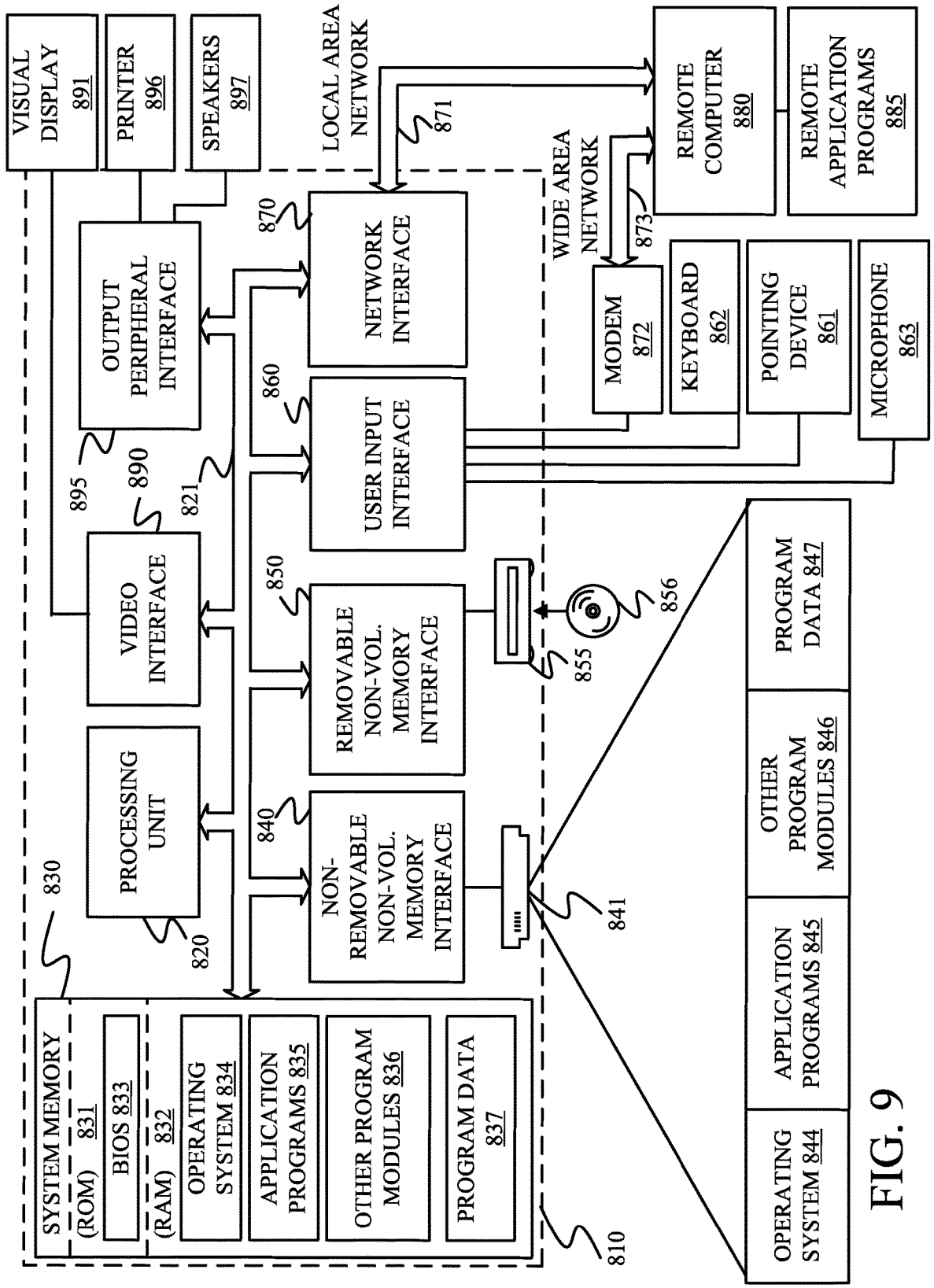
FIG. 9 is a block diagram showing one example of a computing environment that can be used in the architectures shown in the previous figures.

FIG. 9 is one example of a computing environment in which elements of FIG. 2, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a control system for controlling an agricultural machine, comprising:

an initial blockage location identifier that receives a blockage signal indicative of a blockage in a conduit, through which material passes from a container to an application mechanism, that dispenses the material on the field, the initial blockage location identifier identifying a geographic starting location indicative of a geographic location of the application mechanism when the blockage occurred;

a blockage area processing system that identifies a geographic location of an affected area over which the application mechanism traveled during the blockage; and a control signal generator that generates a control signal to control a controllable subsystem on the agricultural machine based on the affected area.

Example 2 is the control system of any or all previous examples wherein the control signal generator generates an operator interface control signal to generate an output indicative of the affected area for surfacing on an operator interface mechanism on the agricultural machine.

Example 3 is the control system of any or all previous examples and further comprising:

a blockage extent identifier generating a blockage extent signal indicative of an extent of the blockage in the conduit, the control signal generator generating the control signal based on the extent of the blockage.

Example 4 is the control system of any or all previous examples and further comprising:

a yield loss processing system that generates an estimated yield loss signal indicative of an estimated yield loss, corresponding to the blockage, based on the affected area, the control signal generator generating the control signal based on the estimated yield loss signal.

Example 5 is the control system of any or all previous examples and further comprising:

a mapping generator configured to, when the blockage extent identifier identifies the extent of the blockage as being sufficient, generate a map indicating the location of the blockage based on the geographic starting location corresponding to the blockage and the affected area.

Example 6 is the control system of any or all previous examples wherein the control signal generator comprises:

a machine control system configured to automatically control the application mechanism to dispense material when the application mechanism is over the affected area.

Example 7 is the control system of any or all previous examples wherein the agriculture machine comprises a dispensing machine with a plurality of independently actuatable sections of application mechanisms and wherein the machine control system comprises:

a section control system configured to selectively actuate different sections of application mechanisms based on the geographic location of the affected area and a geographic location of each of the sections of application mechanisms.

Example 8 is the control system of any or all previous examples wherein the agriculture machine comprises a application machine with a plurality of independently actuatable application mechanisms, each comprising a row unit, and wherein the machine control system comprises:

a row control system configured to selectively actuate different row units based on the geographic location of the affected area and a geographic location of each of the row units.

Example 9 is the control system of any or all previous examples wherein the controllable subsystem comprises a steering subsystem and wherein the control signal generator comprises:

a steering control system configured to automatically control the steering subsystem to steer the agricultural machine to the affected area corresponding to the blockage.

Example 10 is an agricultural application machine control system, comprising:

at least one processor; and memory storing instructions which, when executed by the at least one processor, cause the at least one processor to perform steps, comprising:

receiving a blockage signal indicative of a blockage in a conduit, through which material passes from a container to a dispensing mechanism, that dispenses the material on the field, during an application operation;

identifying a geographic starting location indicative of a geographic location of the dispensing mechanism when the blockage occurred;

identifying a geographic location of an affected area over which the dispensing mechanism traveled during the blockage; and generating a control signal to control a controllable subsystem on the agricultural machine based on the affected area.

Example 11 is the agricultural machine control system of any or all previous examples wherein generating the control signal comprises:

generating an operator interface control signal, indicative of the affected area, for surfacing on an operator interface mechanism on the agricultural machine.

Example 12 is the agricultural machine control system of any or all previous examples wherein the steps further comprise:

identifying a blockage extent indicative of an extent of the blockage in the conduit, wherein generating the control signal comprises generating the control signal based on the extent of the blockage.

Example 13 is the agricultural machine control system of any or all previous examples wherein the steps further comprise:

generating an estimated yield loss signal indicative of an estimated yield loss, corresponding to the blockage, based on the affected area, wherein generating the control signal comprises generating the control signal based on the estimated yield loss signal.

Example 14 is the agricultural machine control system of any or all previous examples wherein the steps further comprise:

generating a map indicating the location of the blockage based on the geographic starting location corresponding to the blockage and the affected area.

Example 15 is the agricultural machine control system of any or all previous examples wherein generating the control signal comprises:

automatically controlling the dispensing mechanism to dispense the material when the dispensing mechanism is over the affected area.

Example 16 is the agricultural machine control system of any or all previous examples wherein the agriculture machine comprises an application machine with a plurality of independently actuatable sections of dispensing mechanisms and wherein generating the control signal comprises:

selectively actuating different sections of dispensing mechanisms based on the geographic location of the affected area and a geographic location of each of the sections of dispensing mechanisms.

Example 17 is the agricultural machine control system of any or all previous examples wherein the agriculture machine comprises an application machine with a plurality of independently actuatable dispensing mechanisms, each comprising a row unit, and wherein generating the control signal comprises:

selectively actuating different row units based on the geographic location of the affected area and a geographic location of each of the row units.

Example 18 is the agricultural machine control system of any or all previous examples wherein the controllable subsystem comprises a steering subsystem and wherein generating the control signal comprises:

automatically controlling the steering subsystem to steer the agricultural machine to the affected area corresponding to the blockage.

Example 19 is a computer implemented method, comprising:

receiving a blockage signal indicative of a blockage in a conduit, through which material passes from a container to a dispensing mechanism, that dispenses the material on the field during a dispensing operation;

identifying a geographic starting location indicative of a geographic location of the dispensing mechanism when the blockage occurred;

identifying a geographic location of an affected area over which the dispensing mechanism traveled during the blockage, based on the geographic starting location and an agricultural machine ground speed indicative of a ground speed of the dispensing mechanism; and generating a control signal to control a controllable subsystem on the agricultural machine based on the affected area.

Example 20 is the computer implemented method of any or all previous examples wherein generating the control signal comprises:

generating an operator interface control signal, indicative of the affected area, for surfacing on an operator interface mechanism on the agricultural machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control system for controlling an agricultural machine, comprising:
   an initial blockage location identifier that receives a blockage signal indicative of a blockage in a conduit, through which material passes from a container to an application mechanism, that dispenses the material on the field, the initial blockage location identifier identifying a geographic starting location indicative of a geographic location of the application mechanism when the blockage occurred;
   a blockage area processing system that identifies a geographic location of an affected area over which the application mechanism traveled during the blockage; and
   a control signal generator that generates a control signal to control a controllable subsystem on the agricultural machine based on the affected area.

2. The control system of claim 1 wherein the control signal generator generates an operator interface control signal to generate an output indicative of the affected area for surfacing on an operator interface mechanism on the agricultural machine.

3. The control system of claim 1 and further comprising:
   a blockage extent identifier generating a blockage extent signal indicative of an extent of the blockage in the conduit, the control signal generator generating the control signal based on the extent of the blockage.

4. The control system of claim 3 and further comprising:
   a yield loss processing system that generates an estimated yield loss signal indicative of an estimated yield loss, corresponding to the blockage, based on the affected area, the control signal generator generating the control signal based on the estimated yield loss signal.

5. The control system of claim 4 and further comprising:
   a mapping generator configured to, when the blockage extent identifier identifies the extent of the blockage as being sufficient, generate a map indicating the location of the blockage based on the geographic starting location corresponding to the blockage and the affected area.

6. The control system of claim 1 wherein the control signal generator comprises:
a machine control system configured to automatically control the application mechanism to dispense material when the application mechanism is over the affected area.

7. The control system of claim 6 wherein the agriculture machine comprises a dispensing machine with a plurality of independently actuatable sections of application mechanisms and wherein the machine control system comprises:
a section control system configured to selectively actuate different sections of application mechanisms based on the geographic location of the affected area and a geographic location of each of the sections of application mechanisms.

8. The control system of claim 6 wherein the agriculture machine comprises a application machine with a plurality of independently actuatable application mechanisms, each comprising a row unit, and wherein the machine control system comprises:
a row control system configured to selectively actuate different row units based on the geographic location of the affected area and a geographic location of each of the row units.

9. The control system of claim 1 wherein the controllable subsystem comprises a steering subsystem and wherein the control signal generator comprises:
a steering control system configured to automatically control the steering subsystem to steer the agricultural machine to the affected area corresponding to the blockage.

10. An agricultural application machine control system, comprising:
at least one processor; and
memory storing instructions which, when executed by the at least one processor, cause the at least one processor to perform steps, comprising:
receiving a blockage signal indicative of a blockage in a conduit, through which material passes from a container to a dispensing mechanism, that dispenses the material on the field, during an application operation;
identifying a geographic starting location indicative of a geographic location of the dispensing mechanism when the blockage occurred;
identifying a geographic location of an affected area over which the dispensing mechanism traveled during the blockage; and
generating a control signal to control a controllable subsystem on the agricultural machine based on the affected area.

11. The agricultural machine control system of claim 10 wherein generating the control signal comprises:
generating an operator interface control signal, indicative of the affected area, for surfacing on an operator interface mechanism on the agricultural machine.

12. The agricultural machine control system of claim 10 wherein the steps further comprise:
identifying a blockage extent indicative of an extent of the blockage in the conduit, wherein generating the control signal comprises generating the control signal based on the extent of the blockage.

13. The agricultural machine control system of claim 10 wherein the steps further comprise:
generating an estimated yield loss signal indicative of an estimated yield loss, corresponding to the blockage, based on the affected area, wherein generating the control signal comprises generating the control signal based on the estimated yield loss signal.

14. The agricultural machine control system of claim 13 wherein the steps further comprise:
generating a map indicating the location of the blockage based on the geographic starting location corresponding to the blockage and the affected area.

15. The agricultural machine control system of claim 10 wherein generating the control signal comprises:
automatically controlling the dispensing mechanism to dispense the material when the dispensing mechanism is over the affected area.

16. The agricultural machine control system of claim 15 wherein the agriculture machine comprises an application machine with a plurality of independently actuatable sections of dispensing mechanisms and wherein generating the control signal comprises:
selectively actuating different sections of dispensing mechanisms based on the geographic location of the affected area and a geographic location of each of the sections of dispensing mechanisms.

17. The agricultural machine control system of claim 15 wherein the agriculture machine comprises an application machine with a plurality of independently actuatable dispensing mechanisms, each comprising a row unit, and wherein generating the control signal comprises:
selectively actuating different row units based on the geographic location of the affected area and a geographic location of each of the row units.

18. The agricultural machine control system of claim 10 wherein the controllable subsystem comprises a steering subsystem and wherein generating the control signal comprises:
automatically controlling the steering subsystem to steer the agricultural machine to the affected area corresponding to the blockage.

19. A computer implemented method, comprising:
receiving a blockage signal indicative of a blockage in a conduit, through which material passes from a container to a dispensing mechanism, that dispenses the material on the field during a dispensing operation;
identifying a geographic starting location indicative of a geographic location of the dispensing mechanism when the blockage occurred;
identifying a geographic location of an affected area over which the dispensing mechanism traveled during the blockage, based on the geographic starting location and an agricultural machine ground speed indicative of a ground speed of the dispensing mechanism; and
generating a control signal to control a controllable subsystem on the agricultural machine based on the affected area.

20. The computer implemented method of claim 19 wherein generating the control signal comprises:
generating an operator interface control signal, indicative of the affected area, for surfacing on an operator interface mechanism on the agricultural machine.

* * * * *